(12) United States Patent
Pecci et al.

(10) Patent No.: US 8,770,095 B2
(45) Date of Patent: Jul. 8, 2014

(54) INFUSION DEVICE TO PREPARE BEVERAGES FORM SINGLE-SERVING CAPSULES WITH CAPSULE CENTERING DEVICE

(75) Inventors: Andrea Pecci, Bologna (IT); Romeo Mattioli, Bologna (IT)

(73) Assignee: Koninklijke Philips N.V., Eindhoven (NL)

(*) Notice: Subject to any disclaimer, the term of this patent is extended or adjusted under 35 U.S.C. 154(b) by 1061 days.

(21) Appl. No.: 12/525,971

(22) PCT Filed: Jan. 31, 2008

(86) PCT No.: PCT/IT2008/000061
§ 371 (c)(1),
(2), (4) Date: Aug. 5, 2009

(87) PCT Pub. No.: WO2008/096385
PCT Pub. Date: Aug. 14, 2008

(65) Prior Publication Data
US 2010/0037779 A1 Feb. 18, 2010

(30) Foreign Application Priority Data
Feb. 7, 2007 (IT) ................. FI2007A0028

(51) Int. Cl.
*A47J 31/06* (2006.01)
(52) U.S. Cl.
USPC ............................................. 99/295; 99/302 P
(58) Field of Classification Search
USPC .................. 99/289 R, 295, 302 R, 303, 323
See application file for complete search history.

(56) References Cited

U.S. PATENT DOCUMENTS

| | | | | |
|---|---|---|---|---|
| 5,755,149 A * | 5/1998 | Blanc et al. | ............... | 99/289 T |
| 5,776,527 A | 7/1998 | Blanc | | |
| 6,035,762 A * | 3/2000 | Ruckstuhl | .................. | 99/295 |
| 6,079,315 A | 6/2000 | Beaulieu et al. | | |
| 6,182,554 B1 * | 2/2001 | Beaulieu et al. | ............ | 99/289 R |
| 7,946,217 B2 * | 5/2011 | Favre et al. | .................... | 99/295 |
| 8,210,096 B2 * | 7/2012 | Fin | .................................. | 99/295 |
| 2001/0011502 A1 * | 8/2001 | Bonanno | ..................... | 99/302 R |
| 2002/0023543 A1 * | 2/2002 | Schmed | ......................... | 99/295 |
| 2005/0129809 A1 * | 6/2005 | Cortese | ......................... | 426/77 |
| 2009/0035438 A1 | 2/2009 | Cortese | | |
| 2009/0249961 A1 * | 10/2009 | Cheng | ......................... | 99/289 R |
| 2010/0101428 A1 * | 4/2010 | Fin | .................................. | 99/295 |

FOREIGN PATENT DOCUMENTS

| | | |
|---|---|---|
| EP | 1 163 869 A1 | 12/2001 |
| EP | 1 219 217 B1 | 7/2002 |
| EP | 1 444 932 B1 | 8/2004 |
| EP | 1 495 702 A1 | 1/2005 |
| EP | 1 559 351 A2 | 8/2005 |
| IT | WO 2006/005736 | 1/2006 |
| WO | 2006005736 A2 | 1/2006 |

* cited by examiner

*Primary Examiner* — Gene Kim
*Assistant Examiner* — Matthew B Stanczak (57) ABSTRACT

An infusion device includes an infusion chamber with first and second portions, movable with respect to each other, one of which defines a seat for a capsule. At least one perforator is disposed in the seat to perforate the capsule. A first duct feeds an infusion fluid into the chamber and a second duct allows delivery of food product from the infusion chamber. A centering member of the capsules is housed in the seat, elastically movable in an axial direction and provided with a guide.

45 Claims, 9 Drawing Sheets

INFUSION DEVICE TO PREPARE BEVERAGES FORM SINGLE-SERVING CAPSULES WITH CAPSULE CENTERING DEVICE

TECHNICAL FIELD

The present invention relates to an infusion device for preparing beverages or other food products from capsules, in particular from single-serving capsules.

More specifically, although not exclusively, the present invention relates to an infusion device for preparing coffee or other hot beverages by extracting or diluting substances contained in single-serving capsules.

PRIOR ART

To prepare hot beverages and other food products, machines are frequently utilized that use single-serving cartridges or capsules, inside which there is contained the substance, which is dissolved in water or from which flavors are extracted by the percolating hot water. Machines of this type are normally used to prepare coffee.

Within the scope of the present description and of the appended claims, capsule is intended as any type of sachet, cartridge, pod or the like, usually in the form of single-serving or single-dose, suitable for use in this type of machine. The capsules can be sealed, to be perforated with a suitable perforator, or also provided with a pervious, i.e. water permeable, wall, which does not require perforation. Sachets produced, for example, in nonwoven or other permeable material, also known in the art as pods, are also covered by the term capsule.

One of the problems occurring in the production of devices for extracting beverages or other food products from single-serving capsules is constituted by the need to position the capsule between two parts or portions of an infusion unit, which must close to retain the capsule therewithin, defining an infusion chamber through which hot water is made to flow and from which the food product is delivered.

EP-A-1444932 describes an infusion device to prepare hot beverages from pods or capsules, provided with an infusion chamber formed of two portions movable with respect to each other by a translational movement. A member is positioned between the two portions of the infusion chamber to temporarily retain the capsules which are inserted between the open portions of the infusion chamber with a movement substantially orthogonal to the axis of the infusion chamber. This device is particularly complex and therefore costly.

EP-A-1495702 describes a similar infusion device with an infusion chamber in two portions movable with respect to each other along a substantially horizontal direction, parallel to the axis of the infusion chamber. Between the two portions of the infusion chamber in the open position, a capsule is inserted, dropped by gravity and then retained in a temporary position. When the portions defining the infusion chamber are moved towards each other this causes insertion of the capsule in the chamber in the position for infusion and closing of said chamber. The movement to close the two portions of the infusion chamber also causes the capsule to be positioned suitably for subsequent unloading after dispensing of the beverage.

U.S. Pat. No. 5,755,149 describes an infusion device with two portions defining an infusion chamber, one of which is produced integral with a boiler. The single-serving capsule is inserted using a vertical guide between the two portions, which are movable with respect to each other in a horizontal direction. Lower supporting means retain the capsule in the correct position to allow closing of the portions defining the infusion chamber.

EP-A-1219217 describes a further infusion device with a chamber formed of two portions movable with respect to each other along a horizontal axis. A vertical guide allows the individual capsules to be inserted by gravity into the open space between the two portions of the infusion chamber. The capsule is housed in a seat which takes a sloped position.

U.S. Pat. No. 5,776,527 describes another infusion unit with an infusion chamber in two portions movable with respect to each other along a horizontal direction. When the two portions are spaced apart, a single serving capsule is placed therebetween and is retained by two guide and support elements until the two portions of the infusion chamber are closed to perform delivery of the hot water.

U.S. Pat. No. 6,079,315 describes an infusion device, in which a portion of the infusion chamber houses a support for the capsule. The support is elastically stressed in a partially extracted position with respect to the seat defined by the portion of the infusion chamber. For this purpose under the support there is disposed a compression spring that surrounds a perforator. The perforator is coaxial with the capsule support. When the capsule is inserted into the support and the infusion chamber is closed, the capsule support is pushed towards the base of the seat of the infusion chamber against the force of the spring and the perforator passes through a hole in the base of the support so as to perforate the capsule. The support has sloping arms to support the capsule along the perimeter flange thereof. The capsule rests on the support substantially only at the flange.

One of the critical aspects in the preparation of beverages from single-serving capsules is represented by controlling the pressure of the infusion liquid, typically hot water, inside the capsule. In particular, when producing "espresso" type coffee, it is advisable for the pressure of the hot water inside the capsule to be relatively high. Incorrect perforation of the capsule, due, for example, to misalignment between capsule and perforator, causes an unwanted drop in the pressure of the liquid in the capsule. In fact, if the capsule is sloping with respect to the perforator, the latter produces an elliptical hole with a larger cross section than the maximum section of the perforator. In this way, a space forms allowing water to exit and causing a drop in pressure in the capsule and a leakage of liquid, consequently compromising correct operation of the machine containing the infusion unit. This drawback can occur both for perforator(s) that produce holes to deliver the beverage from the capsule and for perforator(s) that produce holes to supply liquid to the capsule.

An infusion device for preparing a food product from capsules is known from EP-A-1.163.869. In this known device, the infusion chamber includes a cup-shaped capsule-receiving element, which as an open bottom. Said cup-shaped element is acted upon by a helical spring and is axially movable with respect to a seat provided in the infusion chamber. When capsule is arranged in the cup-shaped capsule receiving element to prepare an espresso, the infusion chamber is closed by moving the lower portion of the infusion chamber towards and against an upper piston. The piston acts upon the capsule and the capsule receiving element. The latter is pushed against the resilient action of the spring against perforators arranged in the bottom of said seat. In the closed infusion position the cup-shaped capsule receiving element is partly inside and partly outside the seat and the annular flange of the capsule is pressed between a disk carried by the piston and the annular front edge of said capsule receiving element. Once the brewing cycle has been completed, the infusion chamber is opened and the capsule receiving element is lifted under the action of the spring. The capsule remains entirely housed in the capsule receiving element, with its annular flange placed against the annular edge of said capsule receiving element.

A similar arrangement is disclosed in EP-A-1,559,351.

OBJECTS AND SUMMARY OF THE INVENTION

An object of the present invention is to provide a new infusion device with an infusion chamber defined by two portions movable with respect to each other and a system that allows improved alignment of the capsule with respect to the perforator or perforators and easier capsule removal after brewing.

According to one embodiment, the invention provides for an infusion device to prepare a food product from capsules, comprising: an infusion chamber with a first portion and a second portion, movable with respect to each other, a first of said portions defining a seat for said capsules; at least one perforator disposed in said seat; a first duct, to feed an infusion fluid into said chamber; a second duct, to deliver the food product from said infusion chamber; a capsule centering member, housed in said seat and elastically movable in an axial direction and provided with a guide and centering surface of the capsules. Preferably, the centering member is elastically stressed to partially project from said seat when the infusion chamber is open. Closing of the infusion chamber causes a retraction movement of said centering member towards the inside of said seat, such that, when the infusion chamber is closed with a capsule therewithin, said centering member is completely inserted inside said seat and set back with respect to said edge.

The centering and guide member ensures that the perforator or perforators and the capsule move with a movement as parallel as possible to the axis of the infusion chamber, i.e. parallel to the direction of the closing movement of the infusion chamber. In this way optimal perforation of the base of the capsule is obtained, preventing drops in pressure inside the capsules and leakage of the beverage. The centering and guide member also ensures that the capsule is pushed outside the seat in the infusion chamber, such that it can easily be ejected from the infusion chamber once the infusion or brewing cycle has been completed. The arrangement is preferably such that the outer diameter of the centering and guide member is smaller than the outer diameter of a capsule flange. In such way the capsule can easily be removed from the infusion chamber by a capsule-retention member, which engages the flange of the capsule once the capsule has been pushed partly outside the seat of the infusion chamber by the elastic force acting on the centering and guide member.

Preferably, the guide surface is conical, converging towards the base of the seat.

In one embodiment, the centering member has an annular shape open towards the base of the seat in which it is slidingly housed. In the base of the seat one or more perforators are housed, around which and beyond which there extends an annular seat, inside which an elastic member can be housed, such as a compression spring, which acts on the centering and guide member of the capsule, to make it project towards the outside of the seat.

In one embodiment, the centering member is produced in one piece and can be stressed by one or more elastic members, such as one or more springs. In a different embodiment, the centering member can be produced in several portions, each of which can be stressed by one or more elastic members, such as one or more compression springs. For example, the centering member can be formed by four sectors of a ring, constrained to one another or movable separately from one another, stressed by respective springs or other elastic members.

In one embodiment the centering member has an outer edge facing towards the second portion of the infusion chamber and an inner edge, surrounding a block inside the seat of the first portion of the infusion chamber, at least one perforator being disposed on said block. The perforator can be constituted by an open tip, i.e. provided with a channel for passage of the beverage (typically coffee) which is produce using the capsule. In a different embodiment, there is provided a multiple perforator, for example constituted by a plurality of perforation tips advantageously provided with respective holes for delivery of the beverage. In this case, a plurality of perforators or perforation tips of the bottom of the capsule are provided. These perforation tips can be produced on a plate or carried by a plate mounted on a base around which the sliding seat of the centering and guide member is arranged.

The top surface of the capsule can also be perforable using one or more perforators. This perforator or these perforators can be associated with an apertured sliding member, such as a disk, which presses the capsule elastically against the base of the seat in which the centering and guide member is slidingly housed. The disk is also used to release the capsule from the perforator or perforators of the top surface of said capsule.

In one embodiment, the centering member comprises at least one guide surface sliding on a complementary guide surface integral with the first portion of the infusion chamber, said guide surfaces extending substantially parallel to a direction of perforation. The complementary guide surface can be constituted by one or other or both of the cylindrical surfaces of a seat with an annular section inside which the centering and guide member slides. In one embodiment the seat surrounds a base in which, for example, there is formed a duct to draw or discharge the beverage produced by the capsule and on which one or a plurality of perforation tips can be mounted.

In one embodiment the second portion of the infusion chamber is associated with two opposite and openable movable elements, comprising guide channels to insert and retain a capsule in a space between the first and the second portion of the infusion chamber when said first and second portion are in the open position. The movable elements can have surfaces, teeth, bosses or other elements to engage the capsule to facilitate extraction from the infusion chamber and unloading after infusion. Alternatively, the same centering and guide member, elastically stressed to project from the seat of the first portion of the infusion chamber, pushes the capsule towards the outside and, advantageously having a conical surface, causes the capsule to be dropped by gravity. If the capsule has a conical outer surface with a small opening angle and consequently the centering and guide element also has a conical surface with a small opening angle, dropping or in any case extraction of the capsule can be facilitated by the movable elements, suitably shaped for this purpose to grip the capsule, preferably at the flange.

Further advantageous features and embodiments of the invention are set forth in the appended claims and will be described in greater detail with reference to a non-limiting embodiment of the invention.

The invention also relates to a coffee machine comprising an infusion device of the aforesaid type.

BRIEF DESCRIPTION OF THE DRAWINGS

The invention will be better understood by following the description and accompanying drawing, which shows a non-limiting practical embodiment of the invention. More specifically, in the drawing.

DETAILED DESCRIPTION OF AN EMBODIMENT OF THE INVENTION

The accompanying drawing illustrates a device according to the invention in a possible embodiment and limited to the elements required for the understanding of the invention, it being understood that this device can be inserted inside a more complex machine, for example a coffee machine provided with further elements known per se and not shown, such as a boiler, a hot water feed pump, a dispensing spout for the coffee, etc.

The numeral 1 indicates, generically and as a whole, the infusion device, which comprises a first portion 5 and a second portion 3 of an infusion chamber. The two portions 3 and 5 are movable with respect to each other according to a direction substantially parallel to the axis A-A of the infusion chamber. In the example shown the axis A-A has a substantially horizontal orientation. In one embodiment the portion 5 is fixed with respect to a load-bearing structure, while the portion 3 is movable, but it must be understood that the arrangement could be inverted, with the portion 5 movable and the portion 3 fixed or both portions could be movable with respect to a load-bearing structure.

In one embodiment, the reciprocal closing and opening movement of the portions 3 and 5 of the infusion chamber is obtained with a lever mechanism 7, 9. The rods 7 of the lever mechanism are hinged in 11 to the portion 3 and are hinged to each other in 12, while in 13 there is connected a motor shaft, an actuating lever or other opening or closing mechanism, not shown.

The second portion 3 of the infusion chamber is associated with a guide member for the capsules, indicated with C, which comprises two elements 15 movable with respect to each other with a reciprocal opening movement, as will be explained hereunder. The elements 15 have a flat or laminar extension and are constrained to the portion 3 of the infusion chamber. In proximity to the distal end each of the elements 15 has a first channel 17 into which the flange of the capsules C is inserted, as will be explained hereunder. Said channels 17 form a guide member for insertion of the capsules C into the infusion unit. The channels 17 of the two elements 15 have a substantially vertical extension up to under the axis A-A of the infusion chamber, where they terminate with a stop 17A (FIG. 4) against which the flange F of the capsule C inserted in the space between the portions 3, 5 of the infusion chamber rests when said chamber is in the open position (i.e. in the layout in FIGS. 1 to 4) to receive a new capsule. A guide bevel to facilitate entry of the flange F of the capsule C in the mouth of the channel 17. Extending behind the channels 17 are surfaces 19 to engage the flange F of the capsule, to facilitate its extraction from the seat 25 of the portion 5 of the infusion chamber, as will be explained hereunder.

Adjacent to the channels 17, on the opposite side with respect to the teeth or surfaces 19, each of the elements 15 has sloping surfaces 21, intended to cooperate with corresponding bevels or sloping surfaces 23 provided on the first portion 5 of the infusion chamber. Orientation of the sloping surfaces 21 and 23 is such that reciprocal movement of the portions 3, 5 of the infusion chamber towards each other during the closing movement thereof (arrow f3, FIG. 2) causes a reciprocal opening movement of the guide elements 15 of the capsule. The elasticity of the elements 15 ensures that when the infusion chamber is opened they return to the original position shown in FIGS. 1 to 4, i.e. parallel to each other. As will be apparent hereunder, the purpose of this opening movement is to release the capsule inside the infusion chamber during closing thereof and to extract the capsule after infusion to cause it to be unloaded downwards.

In the example illustrated, the first portion 5 of the infusion chamber defines a seat or compartment 25, inside which the capsule C is inserted. In the base of the compartment 25 there is disposed a perforator 27 comprising a plurality of open perforation tips 27A, i.e. with a hole that opens in the front part of the tips and is in fluid connection with a duct or channel 29 for delivery of the coffee or other beverage the capsule C is intended to prepare. The perforator 27 is therefore in connection with a duct 29 for delivery of the beverage, in turn in fluid connection with a dispensing spout (not shown).

The tips 27A in substance form a plurality of perforators and are provided on a plate 30 clamped on a base 32 integral with the portion 5 of the infusion chamber. Between the plate 30 and the base 32 a channel 34 is provided that collects the coffee or other beverage delivered from the capsule C during infusion, through the perforators or tips 27A and conveys it towards the delivery duct 29.

The base 32 is surrounded by a seat or annular cavity 36 delimited by two walls substantially cylindrical and coaxial with the axis A-A. The numeral 36A indicates the base of the seat 36. Resting against this base is a compression spring 38 retained between the base 36A and a centering member 40, the function of which is to center and guide the capsules C with respect to the seat 25 and to the perforators 27A, so that the capsules C are guided with a movement as parallel as possible to the axis A-A of the infusion chamber and consequently to the axis of the perforator(s) 27, 27A.

The centering and guide member 40 has a frustum-conical shaped inner surface 40A, the shape of which is substantially the same as the shape of a corresponding frustum-conical shaped outer wall of the capsule C. As will be described in greater detail hereunder, the capsules C are in this way correctly positioned and guided during the step to close the infusion chamber and consequently to perforate the base of said capsules by means of the perforation tips 27A.

The centering and guide member 40 is elastically stressed to enter the seat 25 of the first portion 5 of the infusion chamber when the two portions 3, 5 close against each other, the movement of the centering and guide member 40 causing a compression of the spring 38. The centering member has a substantially cylindrical outer surface that slides along the outermost cylindrical surface of the annular seat 36 and an inner surface, also cylindrical, coaxial with the outer surface and joined to the frustum-conical shaped surface 40A, of which it constitutes the extension towards the base of the seat 25 of the portion 5 of the infusion chamber. The centering and guide member 40 is as a whole annular in shape, open at the front and rear to allow on one side entry of the capsule C and on the other penetration of the base 32 and of the plate 30 with the perforation tips 27A.

In the example shown, the centering member 40 is made in the form of a single annular body, stressed by a single elastic compression spring 38. In a different possible embodiment the centering member 40 can be made in two or more portions or sectors. For example, it can be divided into two specular portions according to a plane containing the axis of the infusion chamber, or into three portions or sectors, separated by radial planes spaced at 120° from one another, or again into four portions separated by planes at 90°. In this case each portion or sector is preferably elastically stressed by a compression spring or by two or more compression springs.

The mouth of the compartment or seat 25 is surrounded by an annular shaped stop or pressure surface 33 forming the end part of the cylindrical wall delimiting the seat 25 and surrounding the base 32. The stop or pressure surface 33 is designed and positioned to cooperated with an annular flange F of the capsule C when the infusion chamber formed by the portions 3, 5 is closed. The flange F of the capsule C is pressed against the annular surface 33 by an opposite front surface of a disk 35 housed in the portion 3 of the infusion chamber when the infusion chamber is closed. When the chamber is open, the annular front edge of the centering and guide member 40 projects, with respect to the annular edge or surface 33, from the seat 25 towards the portion 3 of the infusion chamber.

Figure 1:
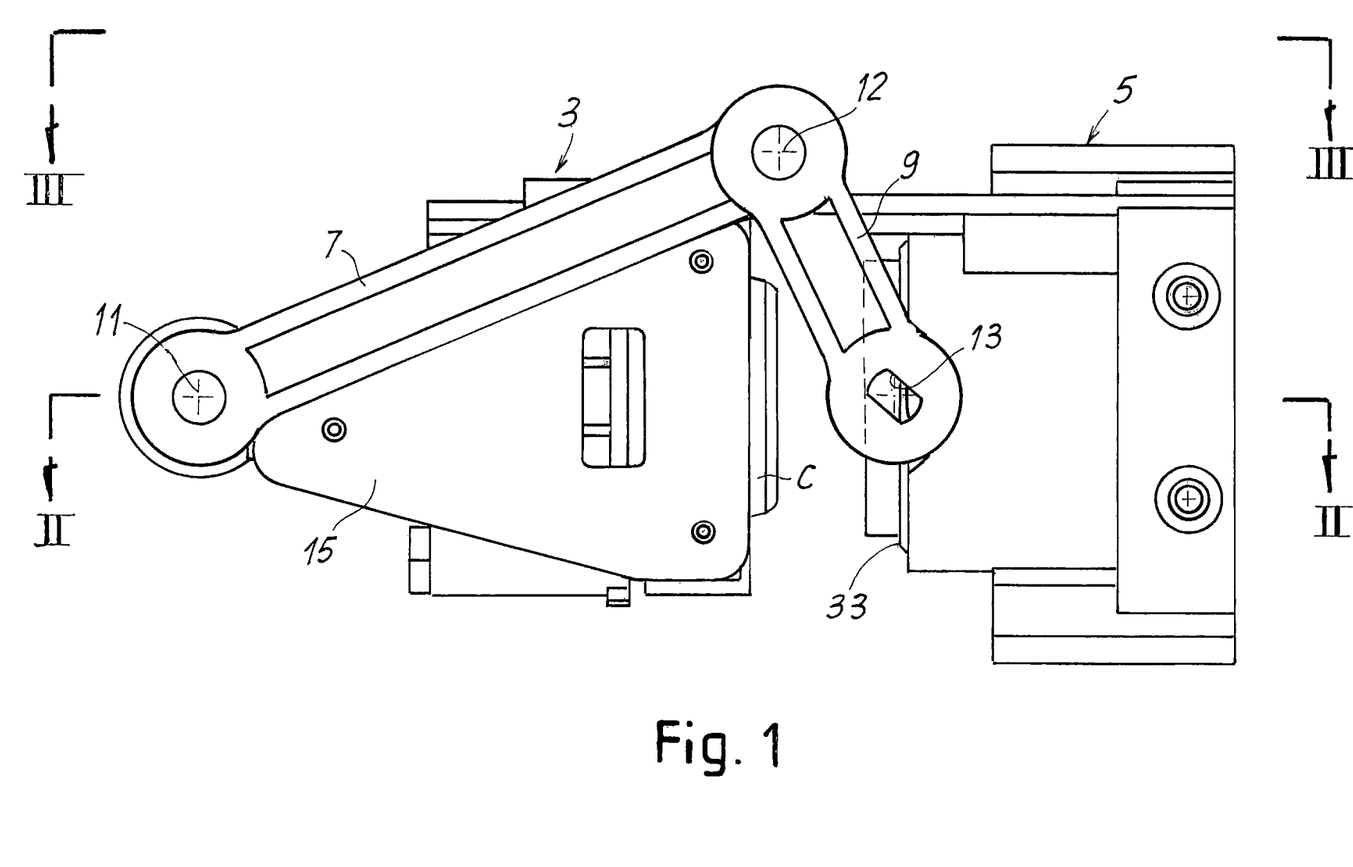
FIG. 1 shows a side view of the device with the infusion chamber open.
Figure 2:
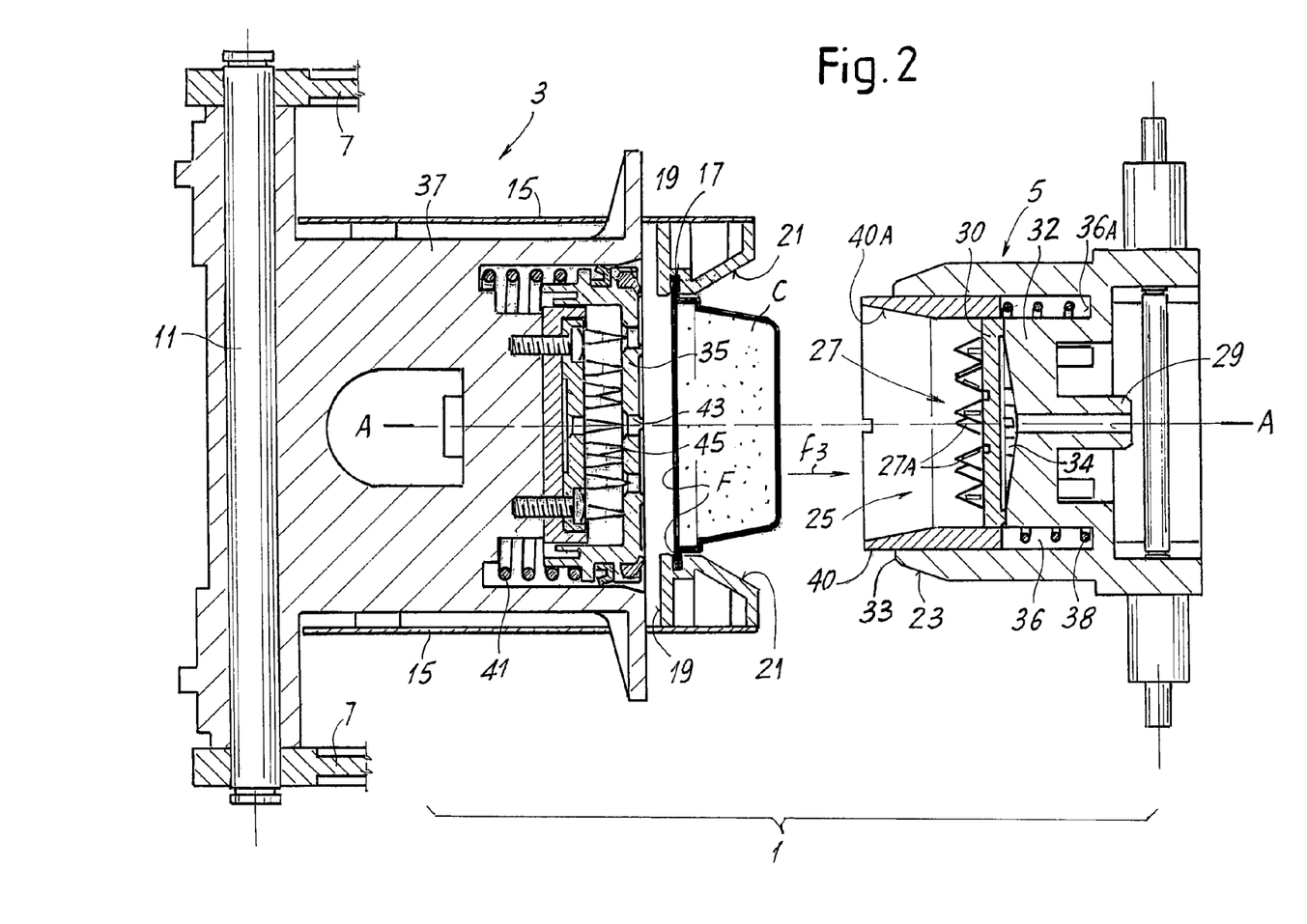
FIG. 2 shows a section according to II-II in FIG. 1.
Figure 3:
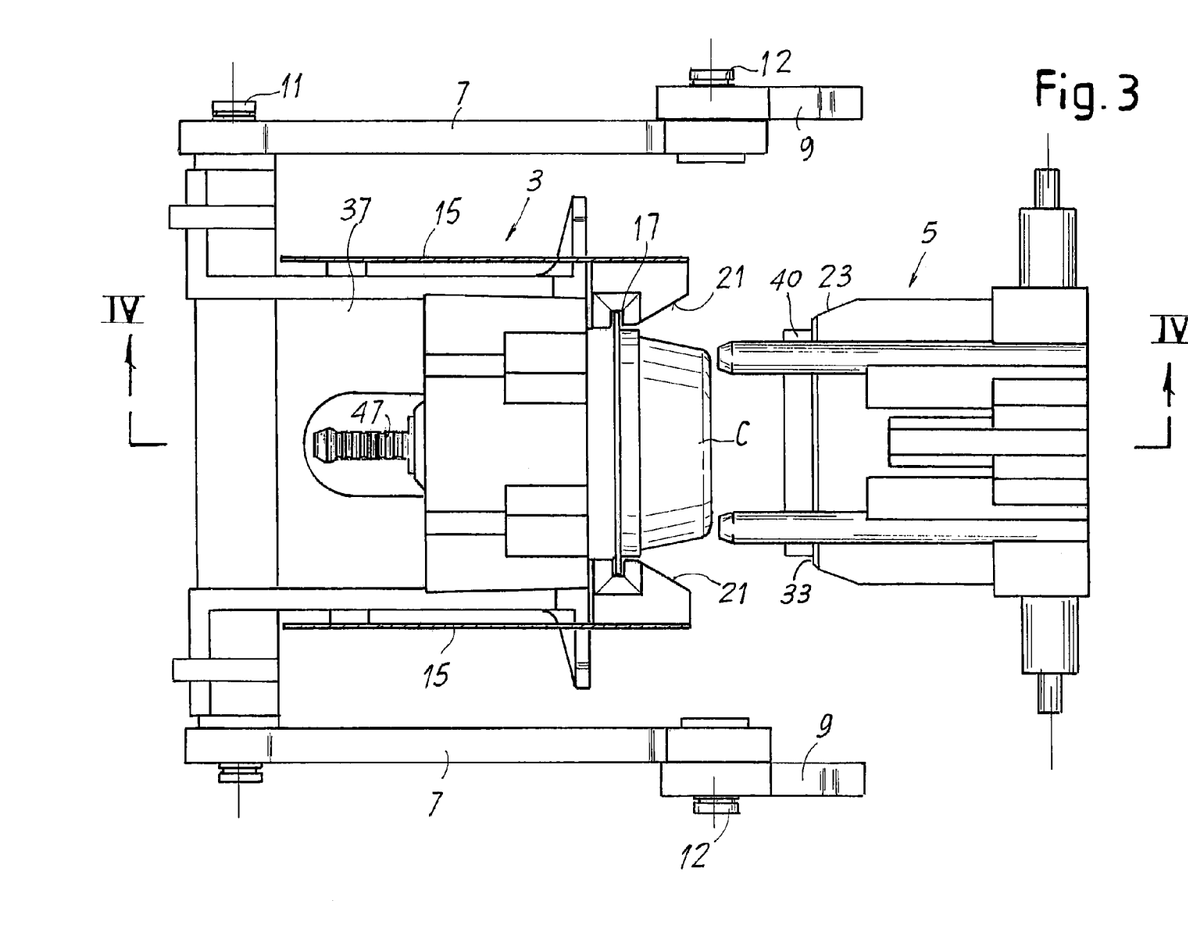
FIG. 3 shows a top view according to III-III in FIG. 1.
Figure 4:
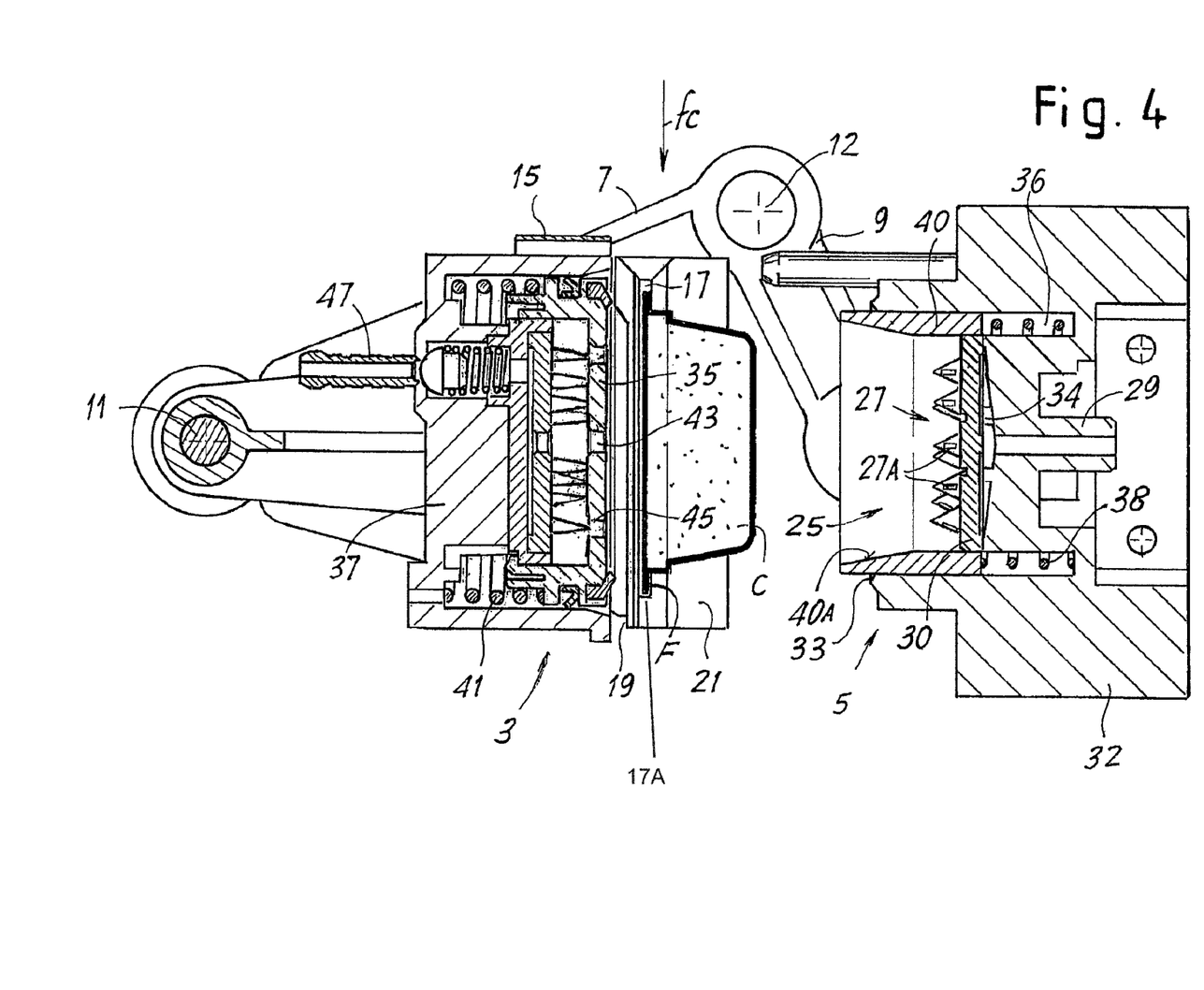
FIG. 4 shows a section according to IV-IV in FIG. 3.
Figure 5:
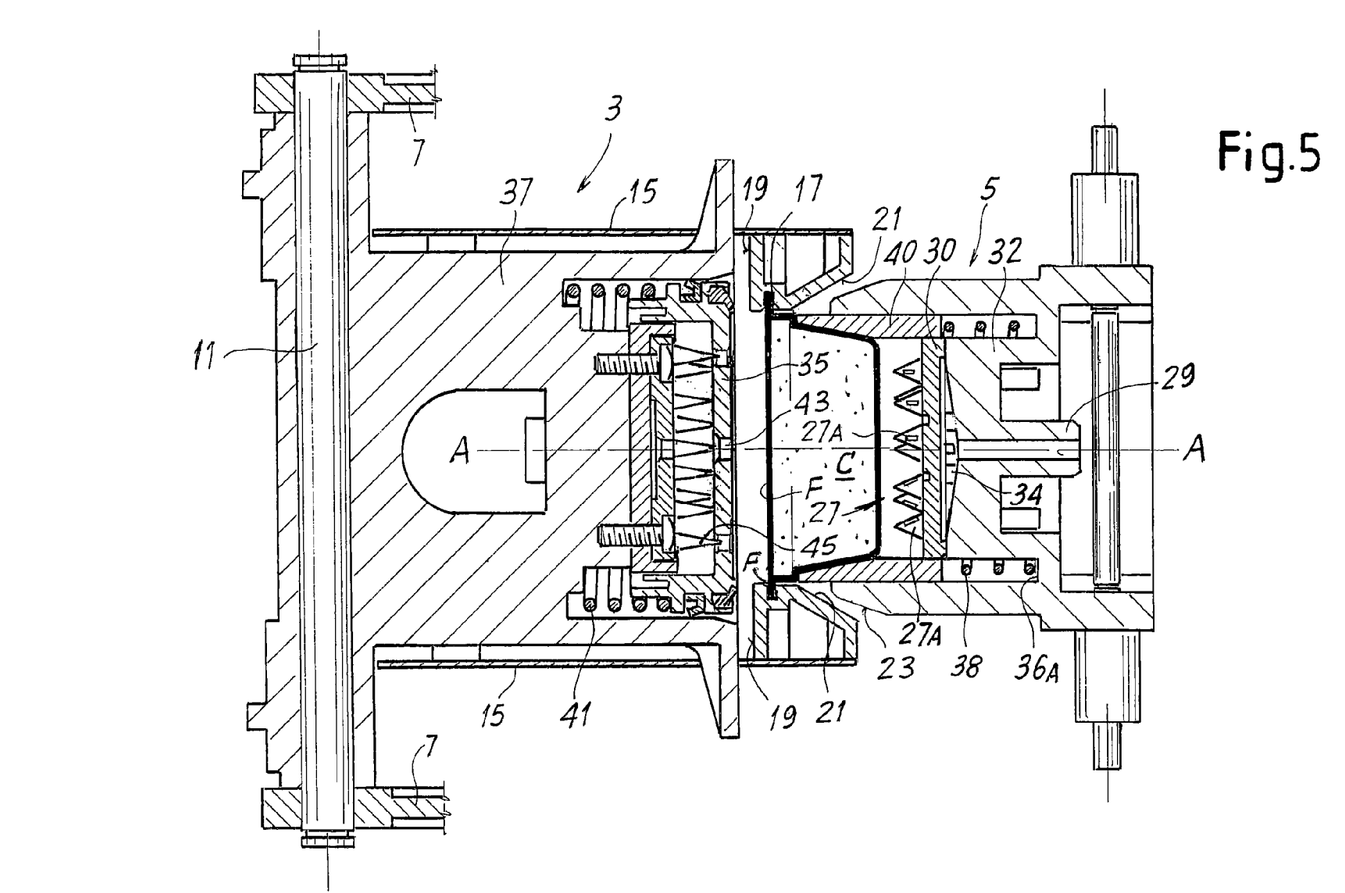
FIGS. 5, 6, 7 and 8 show a sequence of the closing movement of the infusion chamber in a section analogous to the section in FIG. 4.
Figure 6:
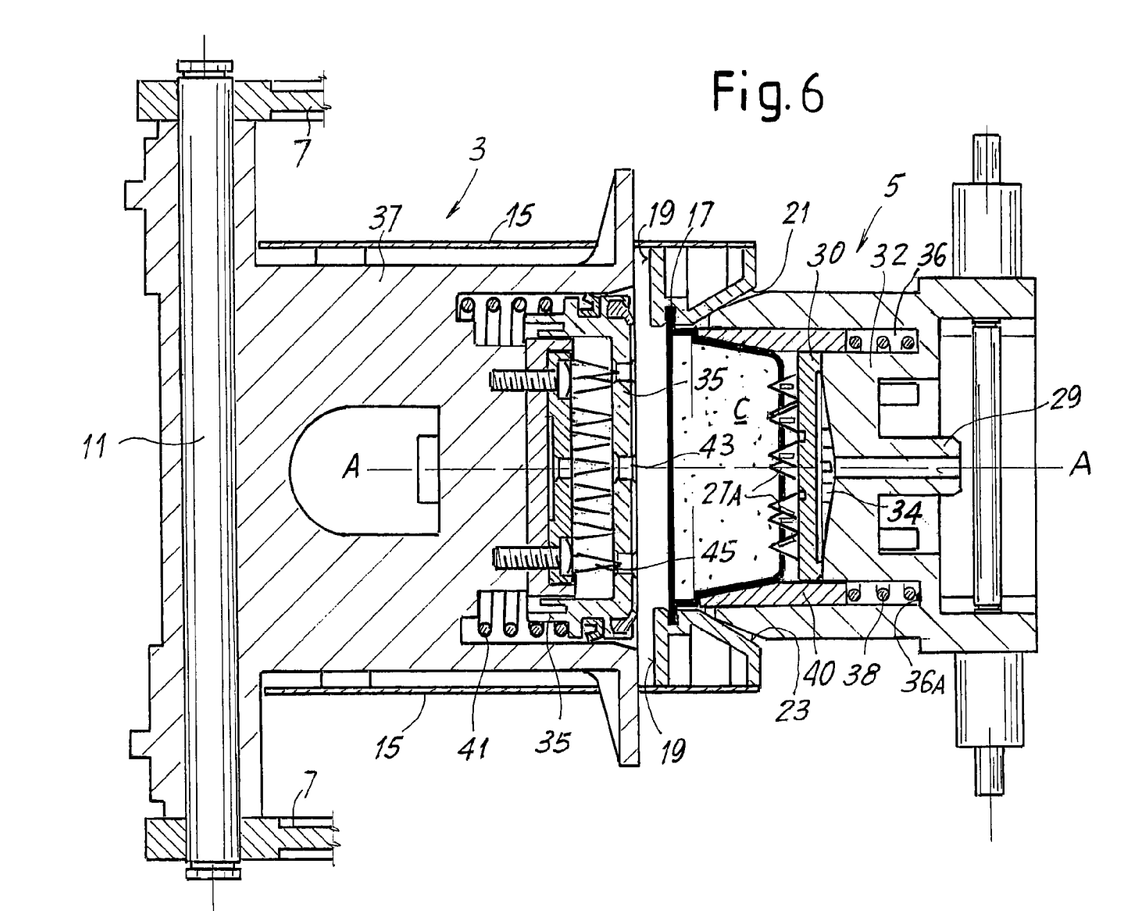
Figure 7:
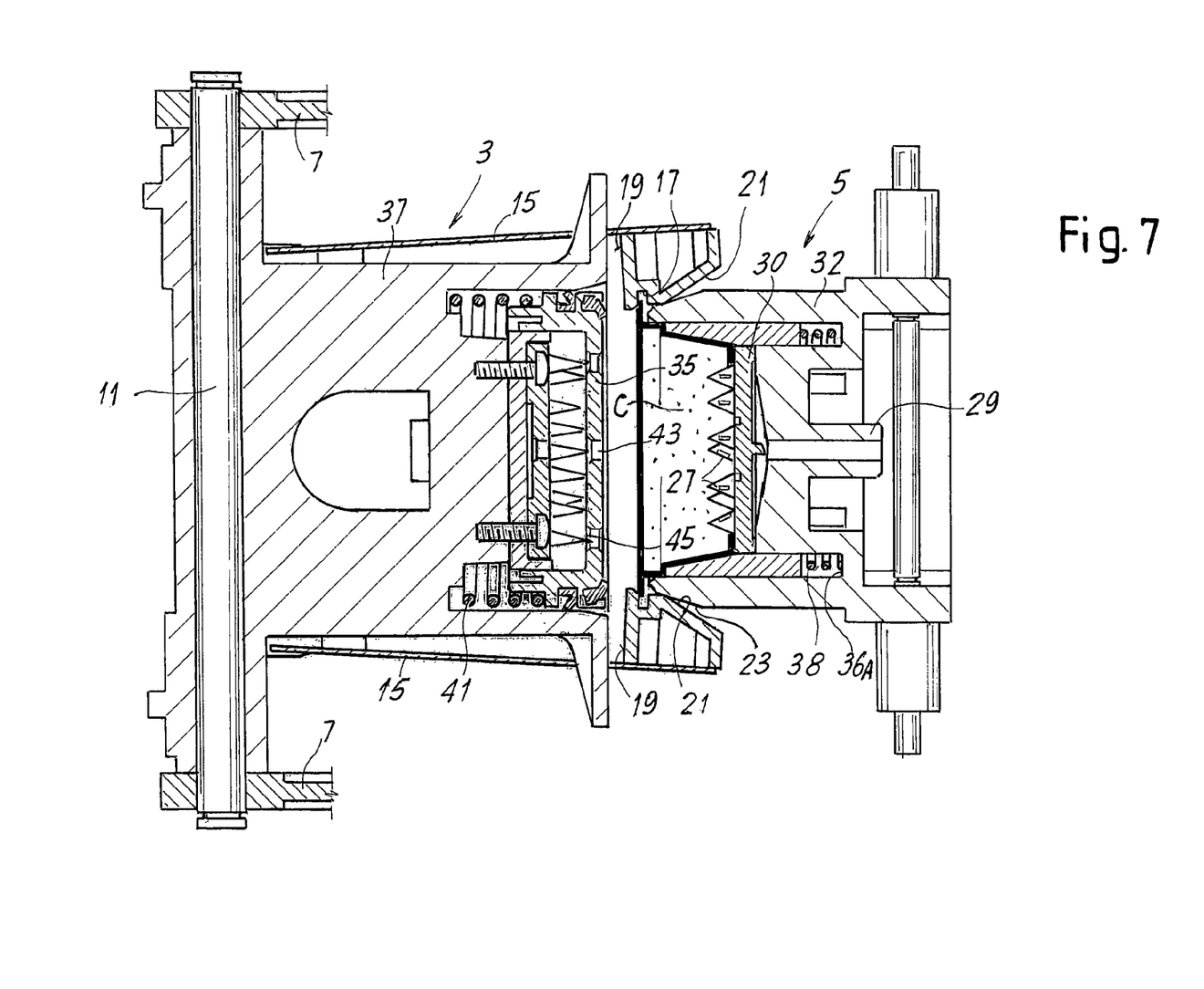
Figure 8:
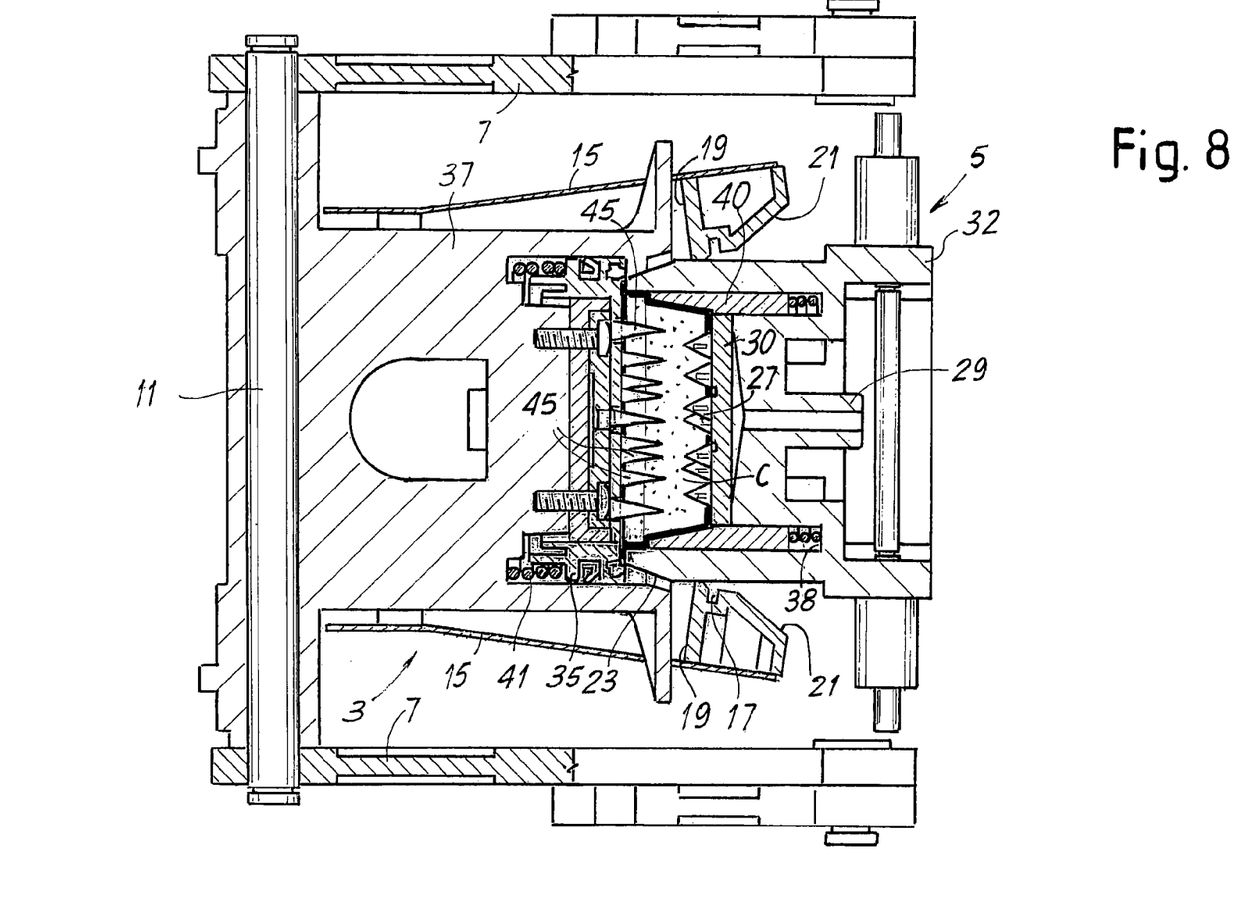

The portion 3 of the infusion chamber substantially has a movable element 37 housed slidingly inside which is the disk 35, which is stressed elastically by a spring 41 towards an idle position illustrated in FIGS. 2 and 4. The slider or disk 35 is slidable in a direction parallel to the axis A-A of the infusion chamber and has a plurality of through holes 43 through which corresponding perforators 45 can project in fluid connection, through a channel 47, with a feed duct of pressurized water coming from a boiler, not shown.

The operating sequence of the device described above is shown in FIGS. 2 to 9. When a beverage is to be prepared, the capsule C containing the raw material for preparation of said beverage, typically coffee powder, is inserted in the device from above according to the arrow fC (FIG. 4). Insertion can take place manually, or automatically or semi-automatically, for example from a magazine or loading device above, not shown. The capsule C is inserted so that the flange F thereof is guided inside the opposite channels 17 provided in the movable elements 15 of the guide member. The guide bevels facilitate insertion of the capsule.

As the channels 17 have inferior stops 17A to halt the capsule, the latter is guided along the channels 17 until reaching the stand-by position shown in FIGS. 1 to 4. The capsule is disposed with the substantially frustum-conical shaped body thereof (in the example illustrated) in front of the centering and guide member 40 housed in the seat 25 of the portion 5 of the infusion chamber.

To perform infusion the chamber 3, 5 is closed by reciprocally moving the two portions 3, 5 towards each other. In practice, the portion 5 can be fixed on a load-bearing structure, while the portion 3 is movable by means of the lever mechanism 7, 9.

FIGS. 5 to 8 show, in sections equivalent to those in FIG. 2, the reciprocal position of the portions 3, 5 of the infusion chamber in the gradual movement towards each other to close. With this movement the capsule C is inserted in the truncated-cone shaped guide portion 40A of the centering and guide member 40. The truncated-cone shaped surface of the capsule C is centered with respect to the portion 5 of the infusion chamber due to the complementary truncated-cone shaped surface 40A and, continuing the closing moment of the portions 3 and 5, the centering and closing member is gradually pushed towards the inside of the seat 25, compressing the spring 38. The movable elements 15 open gradually as a result of the thrust exerted by the sloping surfaces 23 of the elements of the fixed portion 5 of the infusion chamber on the sloping surfaces 21 of said elements 15. When the completely closed position of the infusion chamber is reached (FIG. 8) the flange F of the capsule C has been completely released by the channels 17 of the movable elements 15 and is compressed between the annular front wall 33 and the disk 35. Said disk 35 has been retracted as a result of the thrust exerted by the fixed portion 5 of the infusion chamber, compressing the spring 41. In the movement to withdraw the disk 35 the perforators 45 pass through the holes 43 in the disk 35 and perforate the front surface (surrounded by the flange F) of the capsule. Conversely, the withdrawing movement of the centering and guide member 40 (with compression of the spring 38) causes the base of the capsule C to move against the plate 30, so that the perforation tips 27A perforate the base of said capsule. Due to the centering and guide member 40, with the truncated-cone shaped surface 40A thereof, the capsule C is maintained correctly centered and moves in a direction substantially parallel to the direction of the axis of the perforation tips 27A, so that these form, in the base of the capsule C, holes with cross section corresponding substantially to the cross section of said tips.

When the infusion liquid (typically pressurized hot water) is fed through the capsule and delivered from the perforators 45, it pressurizes the inside of the capsule and the beverage is delivered through the holes in the perforation tips 27A.

Figure 9:
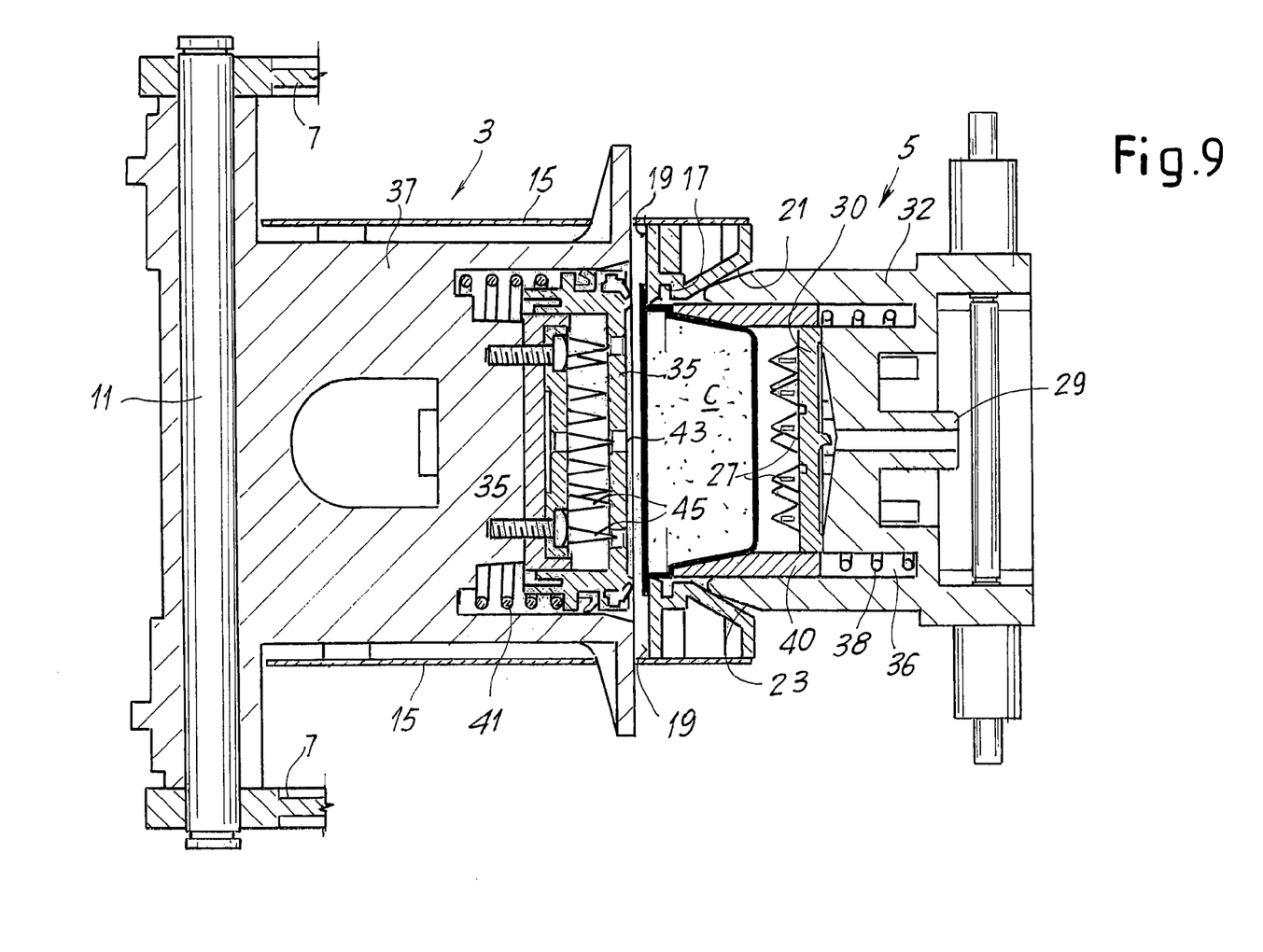
FIG. 9 shows section similar to the section in FIGS. 4 to 8 in the step to open the infusion chamber and start removing the spent capsule.

FIG. 9 shows what happens when, after the beverage has been dispensed, the portions 3, 5 of the infusion chamber open and move away from each other once again. The disk 35 elastically stressed by the spring 41 pushes the capsule C removing it from the perforators 45 and retaining it inside the seat or compartment 25 while the portion 3 of the infusion chamber starts to move away from the portion 5. The two portions 3, 5 of the infusion chamber continue to move reciprocally away from each other and the flange F of the capsule C is pushed towards the outside of the seat 25 as a result of the centering and guide member 40 which, under the thrust of the compression spring 38, moves towards the portion 3 of the infusion chamber and pushes on the flange F of the capsule C. The capsule C drops downwards disengaging from the portion 5 of the infusion chamber as it is withdrawn by the movable elements 15 that engage the flange F and/or as a result of the slope of the conical surface 40A of the centering and guide member 40.

It is understood that the drawing purely shows an example provided merely as a practical arrangement of the invention, which can vary in forms and arrangement without however departing from the scope of the concept on which the invention is based. In particular, the invention can also be used with capsules or pods of different shape, which, for example, do not require perforation of both front walls, which for example are already perforated superiorly and only require perforation of the base. In general, the invention can be used each time the capsule, pod or other sachet of products to produce coffee or other food required to be guided and centered correctly. It must also be understood that the conformation of the infusion chamber, of the perforators, of the mechanism for positioning and extracting the capsule, the position of the axis of the infusion chamber and other characteristics of the device can vary with respect to those described and illustrated in the accompanying drawings. Any reference numerals in the appended claims are provided to facilitate reading of the claims with reference to the description and to the drawing, and do not limit the scope of protection represented by the claims.

The invention claimed is:

1. An infusion device for preparing a food product from capsules, comprising:

an infusion chamber with a first portion and a second portion, movable with respect to each other, the first portion defining a seat for said capsules, said seat being delimited by a cylindrical wall with an edge facing towards said second portion of the infusion chamber and surrounding access to said seat;

at least one perforator disposed in said seat;

a first duct, to feed an infusion fluid into said infusion chamber;

a second duct to deliver the food product from said infusion chamber;

a capsule centering member housed in said seat, which is elastically movable in an axial direction and provided with a capsule guide and centering surface, facing towards the second portion of the infusion chamber, wherein said centering member is elastically stressed to partially project from said seat when said infusion chamber is open, wherein closing of the infusion chamber causes a retraction movement of said centering member towards inside of said seat, such that, when the infusion chamber is dosed with a capsule therewithin, said centering member is completely inserted inside said seat, wherein said second portion of the infusion chamber is associated with two opposite and openable movable capsule engaging elements having fixed ends and moveable ends located opposite the fixed ends, wherein the fixed ends are fixed to the second portion and the moveable ends comprise guide channels to insert and retain the capsule in a space between said first portion and said second portion of the infusion chamber when said first portion and said second portion are in the open position, wherein said movable capsule engaging elements are elastically deformable so that the moveable ends move away from each other to release the capsule when the infusion chamber is closed with the capsule therewithin, and wherein the moveable ends are closer to the first portion defining the seat than the fixed ends.

2. The infusion device as claimed in claim 1, wherein when the infusion chamber is closed with a capsule therewithin, said centering member is set back with resect to said edge.

3. The infusion device as claimed in claim 2, wherein the edge of said seat forms a pressure surface, co-acting with a sealing surface carried by said second portion of the infusion chamber, said edge having a diameter larger than said capsule centering member.

4. The infusion device as claimed in claim 2, further comprising capsule engaging elements, arranged and designed to support a capsule while the infusion chamber is being closed and to engage and remove a capsule from said infusion chamber when the infusion chamber is being opened and said capsule is pushed outside the seat by said centering member.

5. The infusion device as claimed in claim 2, wherein said guide surface is conical, converging towards the base of said seat.

6. The infusion device as claimed in claim 2, wherein said centering member has an annular shape.

7. The infusion device as claimed in claim 6, wherein said centering member has an outer edge facing towards the second portion of the infusion chamber and an inner edge, surrounding a block inside said seat, said at least one perforator being arranged on said block.

8. The infusion device as claimed in claim 1, wherein the edge of said seat forms a pressure surface, co-acting with a sealing surface carried by said second portion of the infusion chamber, said edge having a diameter larger than said capsule centering member.

9. The infusion device as claimed in claim 8, further comprising capsule engaging elements, arranged and designed to support a capsule while the infusion chamber is being closed and to engage and remove a capsule from said infusion chamber when the infusion chamber is being opened and said capsule is pushed outside the seat by said centering member.

10. The infusion device as claimed in claim 8, wherein said pressure surface is formed on a disk supported by said second portion of the infusion chamber.

11. The infusion device according to claim 10, wherein said disk is elastically stressed towards the first portion of the infusion chamber.

12. The infusion device as claimed in claim 11, wherein said disk comprises at least one hole through which a perforator projects when said disk is pushed elastically towards the inside of a housing provided in said second portion.

13. The infusion device as claimed in claim 12, wherein:
in said second portion of the infusion chamber there are disposed a plurality of perforators; and
said disk comprises a corresponding plurality of holes through which said perforators can project when the disk is retracted inside said housing.

14. The infusion device as claimed in claim 1, the capsule engaging elements are configured to support the capsule while the infusion chamber is being closed and to engage and remove the capsule from said infusion chamber when the infusion chamber is being opened and said capsule is pushed outside the seat by said centering member.

15. The infusion device as claimed in claim 1, wherein said centering member has a guide surface which is conical, converging towards parallel walls of said seat near a base of said seat.

16. The infusion device as claimed in claim 1, wherein said centering member has an annular shape.

17. The infusion device as claimed in claim 16, wherein said centering member has outer edge facing towards the second portion of the infusion chamber and an inner edge, surrounding a block inside said seat, said at least one perforator being arranged on said block.

18. The infusion device as claimed in claim 1, wherein said centering member comprises at least one guide surface sliding on a complementary guide surface integral with said first portion of the infusion chamber, said guide surfaces extending substantially parallel to a direction of perforation.

19. The infusion device as claimed in claim 18, wherein said direction of perforation is substantially parallel to an axis of said at least one perforator.

20. The infusion device as claimed in claim 1, wherein in said seat there is disposed an inner wall, positioned on which is said at least one perforator, surrounded by an annular cavity in which said centering member is slidingly guided.

21. The infusion device as claimed in claim 20, wherein in said annular cavity there is housed an elastic compression member, which acts on the centering member, stressing said centering member to project from said seat.

22. The infusion device as claimed in claim 20, wherein said annular cavity surrounds a base through which there extends said second duct for delivery of the food product and fixed on which is said at least one perforator.

23. The infusion device as claimed in claim 22, wherein on said base there is fixed a plate, disposed on which is said at least one perforator, between said base and said plate there being provided a channel to collect the food product, in connection with said second duct.

24. The infusion device as claimed in claim 23, wherein a plurality of perforators are provided on said plate.

25. The infusion device as claimed in claim 1, wherein said opposite movable capsule engaging elements comprise respective extractor members to extract the capsule from the seat in said first portion of the infusion chamber, when said first and second portion are opened.

26. The infusion device as claimed in claim 25, wherein on each of said movable capsule engaging elements the channel and the extractor member are disposed in sequence along the opening and closing direction of the infusion chamber.

27. The infusion device of claim 26, wherein said channels are disposed more distant from the second portion of the infusion chamber than the extractor members.

28. The infusion device as claimed in claim 1, wherein said movable capsule engaging elements have an opening movement in a plane parallel to the direction of the reciprocal opening and closing movement of the first and of the second portion of the infusion chamber.

29. The infusion device as claimed in claim 1, wherein:
said movable capsule engaging elements are constrained to the second portion of the infusion chamber; and
the movement to open said movable capsule engaging elements is caused by interaction of said movable capsule engaging elements with the first portion of the infusion chamber.

30. The infusion device as claimed in claim 1, wherein said movable capsule engaging elements are disposed at the sides of the second portion of the infusion chamber.

31. The infusion device as claimed in claim 1, wherein said first portion of the infusion chamber has thrust profiles cooperating with corresponding thrust profiles of said movable capsule engaging elements to cause reciprocal opening of said movable capsule engaging elements.

32. The infusion device as claimed in claim 31, wherein said first portion of the infusion chamber has opposite outer surfaces sloping with respect to the opening and closing direction of the infusion chamber, forming said thrust profiles.

33. The infusion device as claimed in claim 31, wherein the thrust profiles of the movable capsule engaging elements are formed of surfaces sloping with respect to the opening and closing direction of the infusion chamber.

34. The infusion device as claimed in claim 1, wherein said guide channels are associated with a bottom stop which defines a retaining position of the capsule in the space between the first portion of the infusion chamber and the second portion of the infusion chamber.

35. The infusion device as claimed in claim 34, wherein said guide channels are configured so that in said retaining position the capsule is held with the axis thereof substantially coincident with the axis of the infusion chamber.

36. The infusion device as claimed in claim 1, wherein each of said guide channels terminates with a bottom stop, said stops defining a retaining position of the capsule in the space between the first portion of the infusion chamber and the second portion of the infusion chamber.

37. The infusion device as claimed in claim 1, wherein said first portion of the infusion chamber and said second portion of the infusion chamber are movable according to substantially horizontal direction, said guide channels are substantially vertical and said movable capsule engaging elements are provided with an opening movement in a substantially horizontal plane.

38. The infusion device as claimed in claim 1, wherein said second portion of the infusion chamber is movable and said first portion of the infusion chamber is fixed with respect to a load-bearing structure.

39. The infusion device as claimed in claim 1, further comprising a lever mechanism for manual control of opening and closing of the infusion chamber, wherein the lever mechanism is configured to move the second part towards the first part along an axis passing through the first part and the second part, wherein the axis is parallel to a longitudinal axis of the infusion device.

40. The infusion device as claimed in claim 1, wherein said second portion of the infusion chamber and said movable capsule engaging elements are constrained to a common support.

41. The infusion device as claimed in claim 1, wherein said movable capsule engagning elements are substantially laminar in shape.

42. The infusion device as claimed in claim 1, wherein said centering member is made in a single monolithic piece.

43. The infusion device as claimed in claim 1, wherein said centering member is divided into several portions or sectors.

44. The infusion device as claimed in claim 43, wherein each portion or sector into which said centering member is divided is stressed by at least one elastic member.

45. A coffee machine comprising:
an infusion device, said infusion device comprising:
an infusion chamber with a portion and a second portion, movable with respect to each other, the first portion defining a seat for a capsule, said seat being delimited by a cylindrical wall with an edge facing towards said second portion of the infusion chamber and surrounding access to said seat;
at least one perforator disposed in said seat;
a first duct to feed an infusion fluid into said infusion chamber;
a second duct to deliver food product from said infusion chamber;
a capsule centering member housed in said seat which is elastically movable in an axial direction and provided with a capsule guide and centering surface, facing towards the second portion of the infusion chamber, wherein said centering member is elastically stressed to partially project from said seat when said infusion chamber is opens wherein closing of the infusion chamber causes a retraction movement of said centering member towards the inside of said seat such that when the infusion chamber is closed with the capsule therewithin, said centering member is completely inserted inside said seat,
wherein said second portion of the infusion chamber is associated with two opposite and openable movable capsule engaging elements having fixed ends and moveable ends located opposite the fixed ends, wherein the fixed ends are fixed to the second portion and the moveable ends comprise guide channels to insert and retain the capsule in a space between said first portion and said second portion of the infusion chamber when said first portion and said second portion are in the open position, wherein said movable capsule engaging elements are elastically deformable so that the moveable ends move away from each other to release the capsule when the infusion chamber is closed with the capsule therewithin, and
wherein the moveable ends are closer to the first portion defining the seat than the fixed ends.

* * * * *